April 10, 1928.
H. L. TANNER
1,665,613
COUPLING DEVICE FOR ROTATABLE ELEMENTS
Original Filed June 11, 1920   2 Sheets-Sheet 1
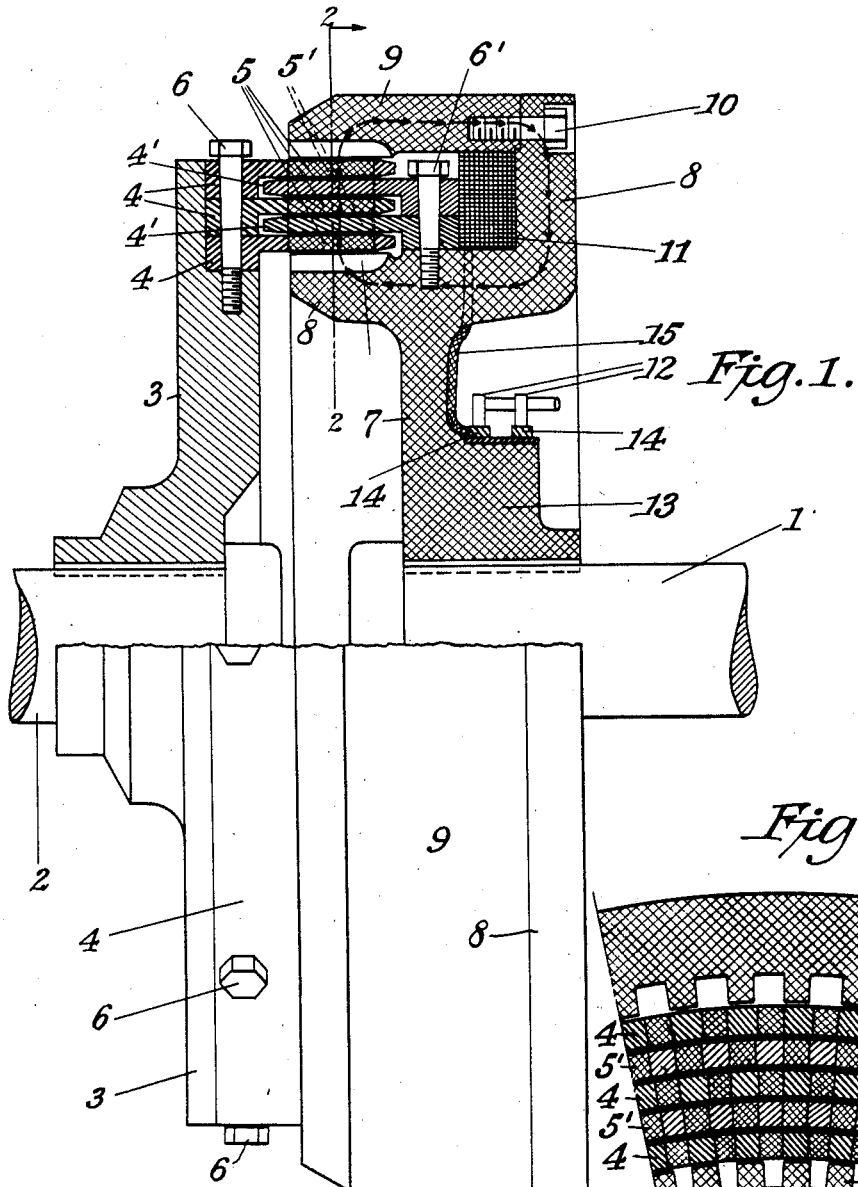
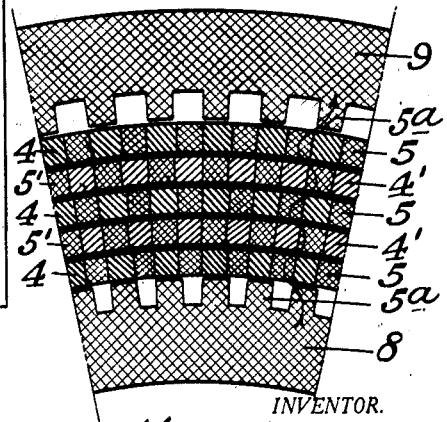
INVENTOR.
Harry L. Tanner
BY
Kerr, Page, Cooper & Hayward
ATTORNEYS.

April 10, 1928.
H. L. TANNER
COUPLING DEVICE FOR ROTATABLE ELEMENTS
Original Filed June 11, 1920   2 Sheets-Sheet 2
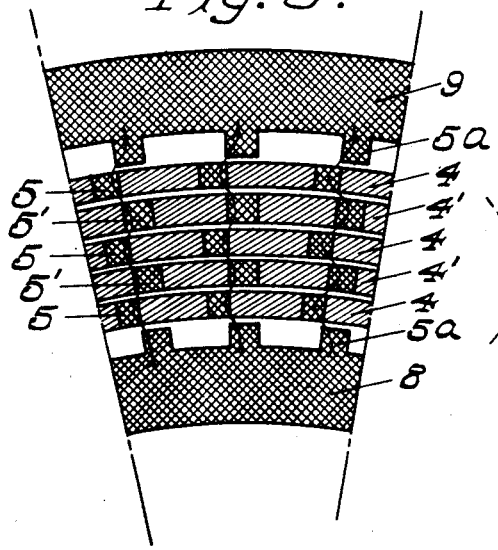
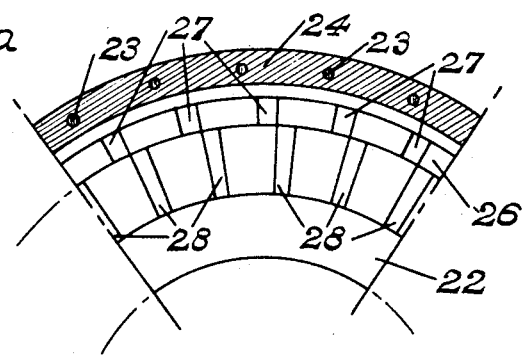
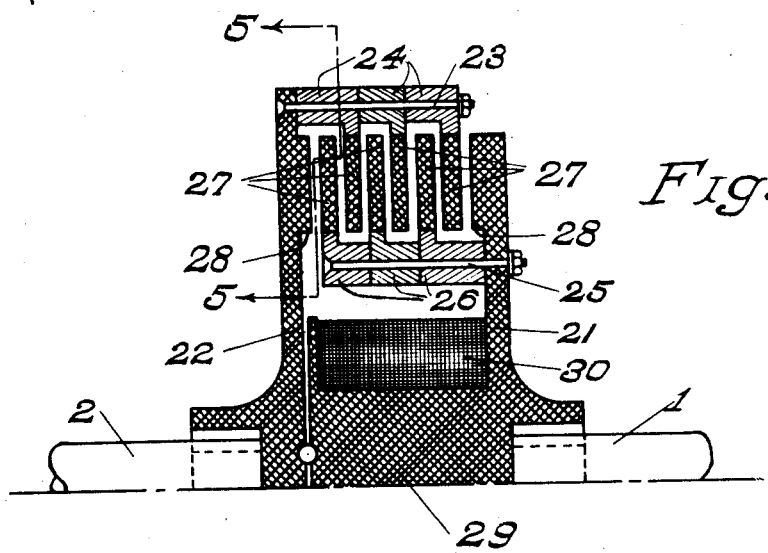
INVENTOR.
Harry L. Tanner
BY
Kerr, Page, Cooper & Hayward
ATTORNEYS Patented Apr. 10, 1928.

1,665,613

UNITED STATES PATENT OFFICE.

HARRY L. TANNER, OF BROOKLYN, NEW YORK.

COUPLING DEVICE FOR ROTATABLE ELEMENTS.

Application filed June 11, 1920, Serial No. 388,173. Renewed May 29, 1926.

The invention forming the subject matter of this application relates to electromagnetic torque applying devices. More specifically the invention relates to a device for forming a drive connection between two independently rotatable elements, said device having for one of its objects to provide a non-slip, non-mechanical connection between said elements.

Other objects and advantages will appear as the invention is hereinafter disclosed.

Referring to the drawings which illustrate what I now consider a preferred form of my invention:

Fig. 1 is an elevation, partly in section, of one form of device embodying the invention.

Fig. 2 is a detail section on the line 2—2 of Fig. 1 illustrating the relative positions of the rows of teeth or bars when one rotatable element is driving the other.

Fig. 3 is a view similar to Fig. 2 but illustrating a modification in the arrangement of the teeth or bars of magnetic material.

Fig. 4 is a half section, with certain lines omitted for simplicity and clearness in illustration, of a modified form of coupling device.

Fig. 5 is a fragmentary detail view taken on the line 5—5 of Fig. 4.

In the form of invention shown in Figs. 1 and 2 the two independently rotatable elements are shown in the form of two shafts 1, 2 mounted for rotation in any suitable bearings or journals (not shown), one of said shafts constituting what may be termed the driving element and the other the driven element. The shaft 2 has keyed or otherwise suitably secured thereto a disk 3, which in turn has secured thereto a plurality of cylindrical rows of teeth or bars of magnetic material such as steel or iron. One form of means for connecting these rows of bars to the said disk is shown in Fig. 1 and may be constructed substantially as follows.

A plurality of hollow cylindrical or annular members 4 of non-magnetic material, such as bronze, are each provided with slots in which the bars 5 of steel or other magnetic material are secured. The total number of bars in any row is shown equal to the number of bars in any other row and the bars in any row are shown equidistantly spaced in a circumferential direction. The cylinders 4 seat at one end against the disk 3, the latter being cut away as indicated to receive the ends of said cylinders. The said cylinders are provided with a plurality of radial holes through each of which a corresponding one of a plurality of bolts 6 of non-magnetic material extends. By screwing the said bolts 6 into the disk 3, a firm connection is obtained. It will be noted the right hand ends of the cylinders 4 are reduced in thickness and that the thickness of the bars 5, in a radial direction, is such as to provide sufficient clearance for the cooperating and interposed rows of teeth (hereinafter more specifically described) to rotate freely with respect thereto.

The shaft 1 has keyed or otherwise suitably secured thereto a substantially disk shaped member 7 of steel or other magnetic material. This disk has secured thereto a plurality of rows of bars 5' of magnetic material by means of annular members 4' and bolts 6', the elements 4', 5' and 6' being so similar to elements 4, 5 and 6, that no detailed description thereof is necessary. Means are provided for passing a magnetic flux through the bars 5, 5'. This means comprises a suitable low reluctance path for the lines of force and a suitable source of magneto-motive-force which may be constructed as follows.

The member 7 is provided with a flange 8 of magnetic material and substantially L-shaped in cross-section as indicated in Fig. 1. The flange 7 has connected thereto, by means of bolts 10, a hollow cylindrical member 9 of magnetic material. A coil or helix 11 of wire is mounted between the flange 8 and members 4' in the annular groove between the members 8 and 9. Obviously if the coil 11 is supplied with electric current lines of force will pass in the path and direction indicated by the arrows in Fig. 1, or in the opposite direction depending on the polarity of the coil 11. Electric current may be supplied to the coil 11 by means of stationary brushes 12, 12, each adapted to engage a corresponding one of slip rings 14 carried by but insulated with respect to a hub 13 provided on the member 7. One suitably insulated terminal or lead 15 of the coil 11 passes through an opening in the member 8 and is electrically connected to one of the slip rings 14. The remaining terminal of the coil is similarly connected to the other slip ring, this connection being concealed in Fig. 1 which is a half section.

The number of rows of bars and consequently the number of air gaps in series may be increased by grooving the inner surface of the member 9 and by grooving the outer surface of the base of the flange 8. By so grooving these members two additional rows of teeth or bars 5ª are provided, the number and spacing of the bars or teeth in the rows 5ª being substantially the same as in the rows 5 and 5' as clearly indicated in Fig. 2. The operation of my invention will be readily understood in view of the following explanation.

Specific attention is directed to Fig. 2 in which members 5, 5', 5ª, 8 and 9 are of magnetic material and the members 4 and 4' of non-magnetic material. For convenience in reading the drawing those of the members shown in Fig. 2 which are of magnetic material are all cross-hatched in the same way while the members of non-magnetic material are indicated by different cross-hatching. From the foregoing description it will be understood that the group of members 4', 5', 8 and 9 all rotate together and with the shaft 1 and the group of members 4 and 5 rotate together and with the shaft 2; but each of these groups of elements is independently rotatable with respect to the other group. Assuming that one of the elements or shafts, for example, the shaft 1, is being rotated by an engine, motor or other power means and that the coil 11 is de-energized, no torque will then be transmitted from the shaft 1 to the shaft 2. If, however, the coil 11 is energized by passing an electric current therethrough, lines of force will pass through the bars 5, 5', 5ª from one of the members 8, 9 to the other. A magnetic torque or drag is thereby set up between the group of elements 5', 5ª and the elements 5 so that a driving connection is formed between the shafts 1 and 2. Fig. 2 illustrates the relative position of the parts when the coil 11 is energized, the elements 4', 8 and 9 are being driven in a clockwise direction and are dragging or pulling around the elements 4. One of the numerous branches of the flux path is indicated by the dotted arrow in Fig. 2.

I wish to emphasize that my invention is in no sense a friction or mechanical-interlocking clutch, although it possesses the advantages of both without their disadvantages. In my device there is a one-to-one drive connection formed between the shafts 1 and 2 when the coil 11 is energized. There is no slip. If an excessive and therefore dangerous load is applied to the one of shafts 1, 2 which is being driven by the other, the device "pulls out". In this respect the action may be likened to an A. C. synchronous motor which is either in step or "pulls out" completely on excessive load. The device illustrated possesses another important advantage in that if the torque exerted by the one of the shafts 1, 2 which is the driving shaft is pulsating the other of the shafts, i. e., the driven shaft, will deliver a substantially uniform torque.

It will be understood that the device shown in Figs. 1 and 2 is not drawn to scale but is merely illustrative of one physical embodiment embodying the principle or law of operation of the invention. Various modifications may be resorted to without departing from the spirit of the invention. Thus in designing coupling devices embodying the present invention I have found that in most cases the best results are obtained when the ratio of tooth pitch to tooth width is substantially four to one. Such an arrangement is illustrated in Fig. 3 which needs no detailed description in view of its similarity to Fig. 2 and in view of the foregoing description.

The form of invention thus far described comprises teeth or bars of magnetic material arranged in coaxial cylindrical rows. In some cases it may be desirable to arrange the teeth in the form of radii of substantially disk-shaped members. One form of device embodying such arrangement is shown in Figs. 4 and 5 and may be constructed substantially as follows.

The disks 21, 22, of magnetic material are each keyed or otherwise secured to a corresponding one of the rotatable elements 1 and 2. The disk 22 has secured thereto, by bolts 23 of non-magnetic material, a plurality of annular members 24 of non-magnetic material and having the cross-section illustrated in Fig. 4. Similarly the disk 21 has secured thereto, by bolts 25 of non-magnetic material, a plurality of annular members 26 of non-magnetic material. It will be noted that the reduced portions of the members 24 alternate in an axial direction with the reduced portions of the members 26. Each of the members 24 and 26 is provided with a plurality of radial tooth-forming inserts 27 of magnetic material. The total number, dimensions and arrangement of inserts 27 on any of the members 24 or 26 is the same as on any other of said members so that the illustration of one member 26 and its teeth 27 in Fig. 5 will suffice for all. Each of the disks 21, 22 is preferably provided with raised tooth-forming portions 28 substantially indentical in number, dimensions and arrangement to the series teeth 27 on each of members 24 and 26.

The disk 21 is shown provided with a spool-forming hub 29 which carries the magnetizing coil 30. The coil 30 may be energized in the manner set forth in connection with the coil 11 and when so energized magnetic flux traverses the device as indicated by the arrows in Fig. 4. The operation of this form of the invention is obvious in view of the description of the preceding form and therefore need not be explained.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

Subject matter claimed herein is disclosed also in my earlier filed application Serial No. 318,869, filed August 21, 1919.

What I claim is:

1. In combination, a rotatable element, a plurality of members of non-magnetic material secured thereto, a second and independently rotatable element substantially co-axial with said first named element, a plurality of members of non-magnetic material secured to said second element and alternately arranged with respect to said first mentioned members, a plurality of series of bars of magnetic material, each series being carried by a corresponding one of said members and the bars in any series being the same in number as the bars in any other series, and means for impressing a magneto-motive-force on said bars to form a non-slip, non-mechanical drive connection between said elements.

2. In combination, a plurality of annular members of non-magnetic material, a rotatable element to which said members are rigidly secured, a second and independently rotatable element, a plurality of annular members of non-magnetic material rigidly secured to said second element and alternately arranged with respect to said first mentioned members, a plurality of annular series of inserts of magnetic material, there being one of such series of inserts in each of said members and the inserts in any series being the same in number as the inserts in any other series, and means for causing magnetic flux to pass through all of said inserts simultaneously whereby a one-to-one drive connection may be established between said rotatable elements.

3. In combination, an annular member of non-magnetic material, a rotatable element to which said member is rigidly secured, a second and independently rotatable element substantially co-axial with said first named element, an annular member of non-magnetic material rigidly secured to said second element, a plurality of annular series of bar-shaped inserts of magnetic material, there being one of such series of inserts in each of said members and the inserts in any series being the same in number as the inserts in any other series, and means for causing magnetic flux to pass through all of said inserts simultaneously whereby a one-to-one drive connection may be established between said rotatable elements.

4. In combination, a rotatable driving element, an independently rotatable element adapted to be driven by said driving element and substantially coaxial therewith, and means for establishing a one-to-one magnetic drive connection between said driving and driven elements, said means including a plurality of isolated magnetic members secured to one of said elements, a plurality of isolated magnetic elements secured to the other of said elements, and means including pole pieces for passing magnetic flux through said members.

5. In combination, a rotatable driving element, a substantially coaxial, independently rotatable element adapted to be driven by said driving member, and means for establishing a one-to-one magnetic drive connection between said driving and driven elements, said means including a plurality of isolated magnetic members, certain of said members being secured to one of said elements and the others of said members being secured to the other of said elements, the members secured to one of said elements being disposed in interspersed relation to the members secured to the other element, and means for passing magnetic flux through said members.

6. In combination, a rotatable driving element, an independently rotatable element adapted to be driven by said driving element and substantially coaxial therewith, and means for causing said driving element to drive said second mentioned element in synchronism with said driving element by magnetic torque, said means including a plurality of isolated magnetic members secured to one of said elements, a plurality of isolated magnetic elements secured to the other of said elements, and means including pole pieces for passing magnetic flux through said members.

7. In combination, an annular member and a plurality of bar-shaped devices of magnetic material carried thereby, each of said devices being isolated throughout the greater portion of its length from said member and from the others of said devices, a rotatable element to which said member is rigidly secured, a second and independently rotatable element substantially coaxial with said first named element, a second annular member and a plurality of bar-shaped devices of magnetic material carried thereby, each of said last mentioned devices being isolated throughout the greater portion of its length from said second annular member and from the others of said devices, said second annular member being rigidly secured to said second rotatable element, and means including said bar-shaped devices and a source of magneto-motive-force for establishing a one-to-one magnetic drive between said rotatable elements.

8. In combination, an annular member of non-magnetic material, a rotatable element to which said member is rigidly secured, a second and independently rotatable element substantially coaxial with said first named element, an annular member of non-magnetic material rigidly secured to said second element, a plurality of annular series of bar-shaped inserts of magnetic material, there being one of such series of inserts in each of said members, and means including said inserts and a source of magneto-motive force for establishing a one-to-one magnetic drive between said rotatable elements.

9. The combination set forth in claim 8 in which one of the annular members surrounds the other of the annular members.

10. In combination, a rotatable element, a plurality of members of non-magnetic material secured thereto, a second and independently rotatable element substantially coaxial with said first named element, a plurality of members of non-magnetic material secured to said second element and alternately arranged with respect to said first mentioned members, a plurality of series of bars of magnetic material, each series being carried by a corresponding one of said members, and means including said bars and a source of magneto-motive force for establishing a one-to-one magnetic drive between said rotatable elements.

11. The combination set forth in claim 8, in which one of the annular members surrounds the other of the annular members and in which the number of inserts carried by one member is equal to the number of inserts carried by the other member.

12. The combination set forth in claim 10, in which the number of bars carried by one member is equal to the number of bars carried by another member.

In testimony whereof I hereto affix my signature.

HARRY L. TANNER.